United States Patent
Axe et al.

(10) Patent No.: US 6,883,335 B2
(45) Date of Patent: Apr. 26, 2005

(54) AIR CONDITIONING SYSTEM

(75) Inventors: Richard James Axe, Yeovil (GB); Richard Grant Hunt, Yeovil (GB)

(73) Assignee: Honeywell Normalair-Garrett (Holdings) Limited (GB)

( * ) Notice: Subject to any disclaimer, the term of this patent is extended or adjusted under 35 U.S.C. 154(b) by 28 days.

(21) Appl. No.: 10/685,963

(22) Filed: Oct. 15, 2003

(65) Prior Publication Data

US 2004/0089016 A1 May 13, 2004

(30) Foreign Application Priority Data

Nov. 8, 2002 (GB) ............................................. 0226109

(51) Int. Cl.$^7$ ................................................. F25B 9/00
(52) U.S. Cl. ............................... 62/87; 62/401; 62/402
(58) Field of Search ............................ 62/401, 402, 86, 62/87, 88, 92, 172, 239, 241, 333, 510

(56) References Cited

U.S. PATENT DOCUMENTS

| | | | | |
|---|---|---|---|---|
| 3,965,673 A | * | 6/1976 | Friedrich | 60/788 |
| 4,283,924 A | * | 8/1981 | Schutze | 62/402 |
| 4,312,191 A | * | 1/1982 | Biagini | 62/402 |
| 4,550,573 A | * | 11/1985 | Rannenberg | 62/172 |
| 4,963,174 A | | 10/1990 | Payne | 62/87 |
| 5,461,882 A | | 10/1995 | Zywiak | 62/401 |
| 5,511,385 A | * | 4/1996 | Drew et al. | 62/172 |
| 5,701,755 A | | 12/1997 | Severson et al. | 62/402 |
| 5,704,218 A | * | 1/1998 | Christians et al. | 62/172 |
| 5,899,085 A | * | 5/1999 | Williams | 62/236 |
| 5,906,111 A | * | 5/1999 | Lui | 62/402 |
| 6,216,981 B1 | * | 4/2001 | Helm | 244/118.5 |
| 6,519,969 B1 | * | 2/2003 | Sauterleute | 62/401 |
| 6,615,606 B1 | * | 9/2003 | Zywiak | 62/402 |
| 6,637,215 B1 | * | 10/2003 | Leathers | 62/87 |
| 6,658,873 B1 | * | 12/2003 | Clarke et al. | 62/172 |

FOREIGN PATENT DOCUMENTS

| | | | |
|---|---|---|---|
| GB | 2087540 | | 5/1982 |
| JP | 403086699 A | * | 4/1991 |
| JP | 2000038902 A | * | 2/2000 |

* cited by examiner

*Primary Examiner*—William C. Doerrler
*Assistant Examiner*—Mohammad M. Ali
(74) *Attorney, Agent, or Firm*—MacMillan, Sobanski & Todd, LLC

(57) ABSTRACT

An air conditioning system for an aircraft in which cabin air is recirculated and mixed with cold air from an air conditioning machine which includes at least one expansion turbine over which warm pressurized air is expanded and cooled, and wherein the system includes a heat exchanger in which a heat load from hot cabin air is exchanged with the warm pressurized air prior to the pressurized air being expanded by the expansion turbine, further including a condenser heat exchanger in which recirculating cabin air is used to cool and promote water removal from the warm pressurized air before it is expanded by the expansion turbine.

8 Claims, 2 Drawing Sheets

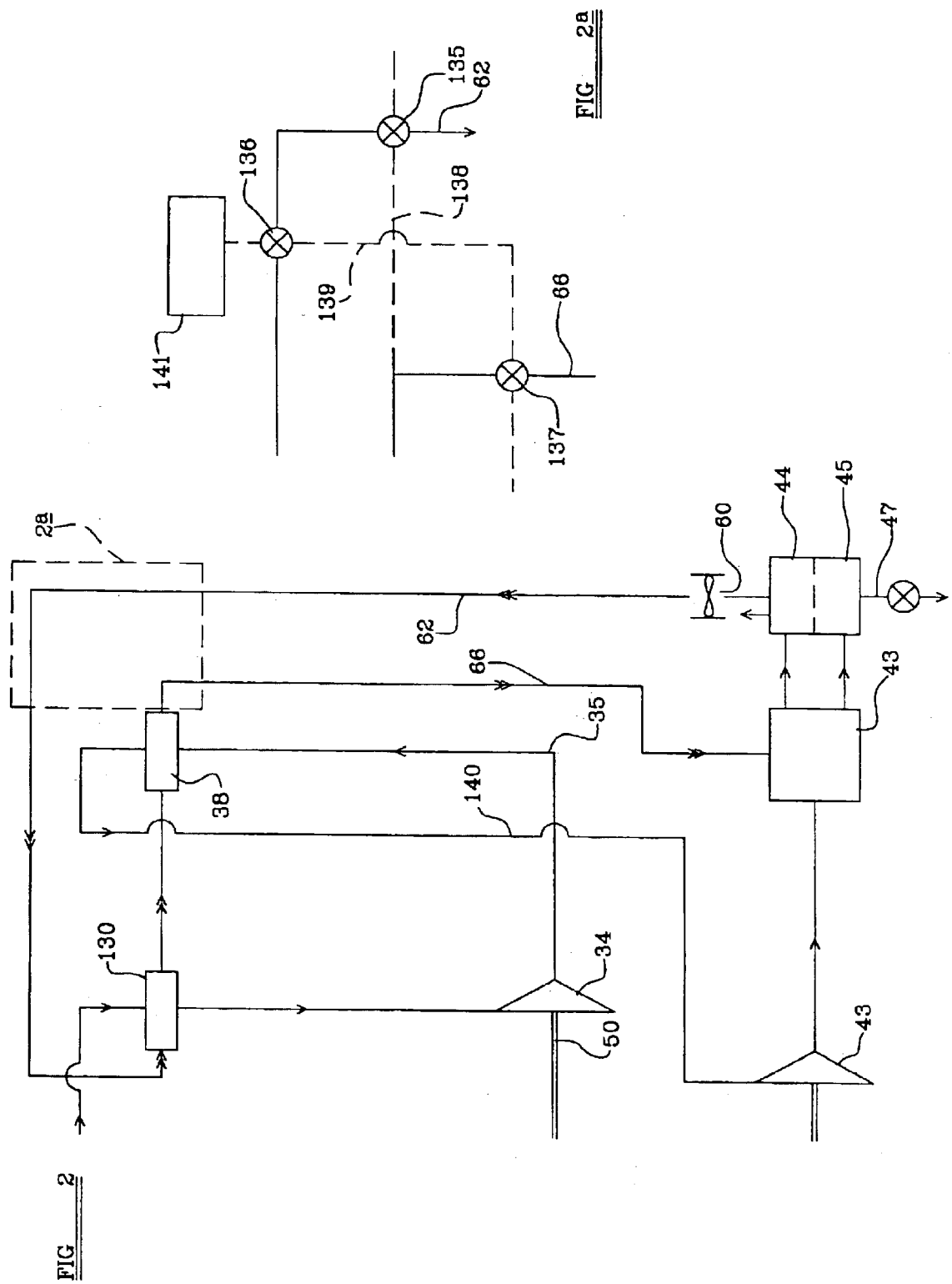

AIR CONDITIONING SYSTEM

BACKGROUND OF THE INVENTION

This invention relates to an air conditioning system and more particularly to such a system for an aircraft.

It is a requirement in an aircraft to supply cool air to a pressurised cabin thereof. Usually the cabin air is recirculated with some of the air being Refreshed by air obtained from the exterior of the aircraft.

Typically such external air is bled from an engine of the aircraft and is thus pressurised. Such air requires filtering and cooling before being mixed with recirculating air for introduction into the aircraft cabin for breathing and for the maintenance of comfortable conditions.

DESCRIPTION OF THE PRIOR ART

It is known to cool the air by exchanging heat in the hot pressurised air with cooler ambient air. This may efficiently be achieved by first compressing the bled air to increase its temperature and pressure before cooling the air. Also it is known to cool the air further by expanding the air over an expansion turbine, which also results in some pressure loss in the compressed air.

With conventional systems, hot cabin air is ejected from the air conditioning system and loss of volume is made up by the cooled conditioned bleed air. Thus the heat energy of the hot cabin air which is ejected, is wasted.

Especially where an aircraft is parked on the ground in hot climatic conditions, the cabin air may become very hot and using a conventional air conditioning system, it may take some time after the air conditioning system is started up, e.g. when the aircraft engine or engines are started, or when a ground based support unit is used to provide air to the air conditioning system, for the cabin air to be cooled to a desirable temperature. Thus a considerable amount of heat energy may be wasted.

More particularly, the present invention relates to an air conditioning system for an aircraft in which cabin air is recirculated and mixed with cold air from an air conditioning machine which includes at least one expansion turbine over which warm pressurised air is expanded and cooled, and wherein the system includes a load heat exchanger in which a heat load from hot cabin air is exchanged with the warm pressurised air prior to the pressurised air being expanded by the expansion turbine. In such a system, waste heat in the cabin air may usefully be employed to provide energy to improve the cooling efficiency of the expansion turbine.

SUMMARY OF THE INVENTION

According to one aspect of the present invention, we provide an air conditioning system for an aircraft, in which cabin air is recirculated and mixed with cold air from an air conditioning machine which includes at least one expansion turbine over which warm pressurised air is expanded and cooled, and further includes a heat load exchanger in which a heat load from hot cabin air is exchanged with the warm pressurised air prior to the pressurised air being expanded by the expansion turbine; and wherein there is a condenser heat exchanger in which recirculating cabin air is brought into heat exchange relationship with the warm pressurised air to cool and promote water removal therefrom prior to its being expanded by the expansion turbine.

Thus in a system in accordance with the present invention heat recovery is improved and water contained in the warm pressurised air may be removed. One advantage of the removal of water from the warm pressurised air before it is expanded and cooled in the expansion turbine is that the formation of any droplets of water in the pressurised air as a result of its compression can cause damage to the blading of the expansion turbine, which typically turns at some tens of thousands of rpm.

The recirculating cabin air may pass through the condenser heat exchanger, to cool and remove water from the warm pressurised air, after it has passed through the load heat exchanger to give up heat to the pressurised air.

Alternatively the recirculating hot cabin air may pass through the condenser heat exchanger, to cool the pressurised air and remove water therefrom, before it passes through the load heat exchanger to give up heat energy to the pressurised air.

The system may be selectively operable in either of the above modes.

The pressurised air may be derived from an engine of the aircraft ("bleed air") in which case it will be hot and pressurised and thus require cooling before being mixed with recirculating air for introduction into the aircraft cabin. It may firstly be cooled by exchanging heat with ambient air which is caused to flow through at least one heat exchanger through which the bleed air is passed as a consequence of the aircraft's motion ("ram air") or by the use of a fan or fans (which may be driven by the expansion turbine).

The water removed from the warm pressurised air may be delivered, e.g. in the form of a spray, into the ambient air prior to the heat exchanger(s) which first cools the bleed air, to assist the cooling of the latter.

BRIEF DESCRIPTION OF THE DRAWINGS

Embodiments of the invention will now be described by way of example with reference to the accompanying drawings, of which:

FIG. 2 is an illustrative diagram of a modified version of the air condition system;

FIG. 2a shows a modification of the system of FIG. 2.

DESCRIPTION OF THE PREFERRED EMBODIMENTS

Figure 1:
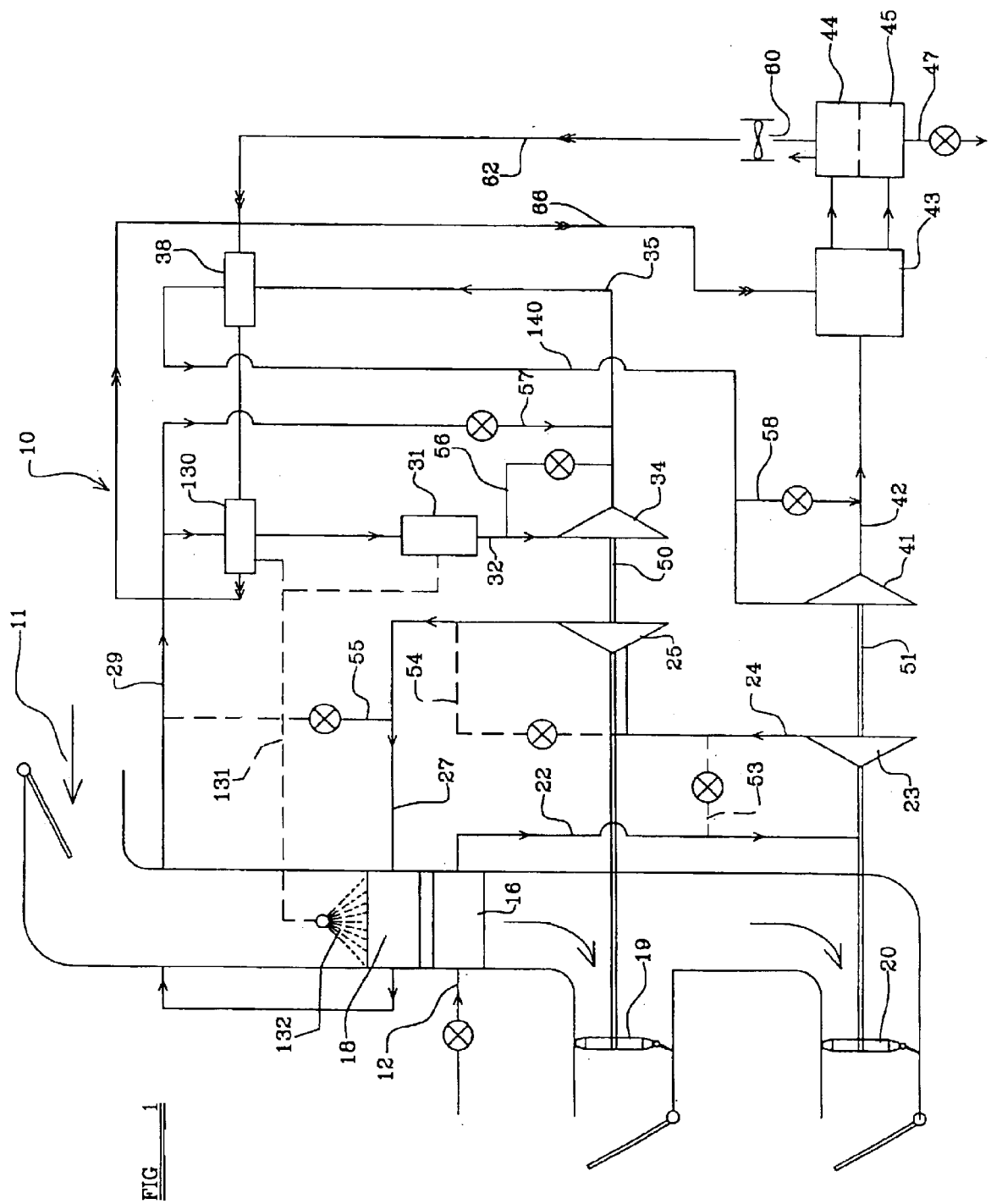
FIG. 1 is an illustrative diagram of an air conditioning system in accordance with the invention.

Referring to FIG. 1 of the drawings, an air conditioning system 10 for an aircraft includes a ram air inlet 11 through which ambient air is introduced to the system 10 when the aircraft is in flight, the ram air generally being driven into the system 10 due to the movement of the aircraft through the air.

The system 10 further includes another air inlet 12 for air bled from the engine. Such bleed air is hotter than the ram air, and is pressurised.

The hotter bleed air from inlet 12 is fed to a primary heat exchanger 16 where heat is exchanged with the cooler ram air from ram air inlet 11. The cooler ram air from ram air inlet 12 is also used to cool hot air in a secondary heat exchanger 18 as hereinafter described. The thus warmed ram air then returns to ambient, if desired, with the assistance of fans 19, 20 as hereinafter described.

The fans 19, 20 will assist in drawing in ram air through ram air inlet 11, particularly when the aircraft is on the ground e.g. as the aircraft taxiing.

The air conditioning system 10 includes a two stage compressor/turbine arrangement. In a compressor section of the system 10, the cooled bleed air is first fed from the primary heat exchanger 16 via a duct 22 to a low pressure compressor 23 which thus pressurises and causes heating of the bleed air. From the low pressure compressor 23 the pressurised and heated air is fed along a duct 24 to a high pressure compressor 25 where the air is further pressurised and heated.

The resulting high pressure and hot air is passed to the secondary heat exchanger 18 along a duct 27, and from the secondary heat exchanger 18 the cooled, now warm high pressure air passes along a duct 29 to a cooling section of the system 10. The warm pressurised air is fed from duct 29 to a condenser heat exchanger 130 followed by (optionally) a water separator 31. In the heat exchanger 130 the warm pressurised air is cooled for a purpose hereinafter explained and this cooling causes the separation of water therefrom. Such water separation is effective at the high pressure of the pressurised air.

The warm pressurised air is then fed via a duct 32 to a first, high pressure, expansion turbine 34 where the warm pressurised air expands and is cooled. From the high pressure turbine 34, the cooled but still warm lower pressure air is passed along a duct 35 (possibly including a further water separator (not shown) further to dry the air), and the medium pressure dried air then passes via a load heat exchanger 38 where the air is warmed, via a duct 140 to a second (low pressure) expansion turbine 41, where the air is further and substantially cooled and its pressure reduced. The cold air passes from the second expansion turbine 41 via a duct 42 to a mixing box 43 from which air is supplied to an aircraft cabin 44, 45. Two ducts are shown leading from the mixing box 43 to respective parts of the cabin 44, 45, e.g. a main cabin part and the aircraft's flight deck.

Air is recirculated from the aircraft cabin 44, 45 via a recirculating loop including a duct 62, with a fan 60, and a duct 66 leading to the mixing box 43, in which the recirculating cabin air is mixed with the cold air from the duct 42. An outlet for a portion of the air from the cabin 44, 45 to ambient atmosphere is indicated at 47, including a valve for controlling such outlet.

In this example, the low pressure compressor 23 and the second low pressure turbine 41 are carried on a common shaft 51 such that the compressed air expanding across the turbine 41 drives the low pressure compressor 23. Furthermore one of the fans 20 which is effective to eject warmed ram air from the system 10 is also provided on the shaft 51 and is thus driven by the expanding compressed air.

The first high pressure expansion turbine 34 is carried on a shaft 50 on which the high pressure compressor 25 and other fan 19 are carried so that the high pressure compressor 25 and fan 19 are driven by the pressurised air expanding across the first turbine 34.

It can be seen from the drawing that in the compressor section of the system 10 there is a valve controlled by-pass 53 from the duct 22 past the first compressor 23, to the duct 24 between the low pressure compressor 23 and the high pressure compressor 25, and a further valve controlled by-pass 54 from the duct 24 to duct 27 past the high pressure compressor 25, so that the high pressure compressor 25 can be by-passed as permitted by the valve. Also, there is a valve controlled by-pass 55 from the duct 27 to the duct 29 past the secondary heat exchanger 18.

In the cooling section of the system 10 there is a valve controlled by-pass 56 from the duct 32 past the first high pressure turbine 34 to the outlet of the turbine 34, a valve controlled by-pass 57 from the duct 29 from the secondary heat exchanger 18 to the outlet duct 35 past the first high pressure turbine 34, and a valve controlled by-pass 58 from the duct 140 past the second expansion turbine 41, to the cold air duct 42 from the second expansion turbine 41.

The valves of the by-passes 53, 54, 55, 56, 57, 58 may be operated by a system controller (not shown in FIG. 1) to balance the system 10 in various operating conditions, and to ensure that the cold air entering the mixing box 43 is of a desired temperature and pressure. If desired, the valves in by-passes 53, 54 may be simple check valves.

It will be appreciated that when the aircraft is on the ground particularly in hot climates, the cabin temperature can rise significantly, for example to 55° C. Conventionally upon system start-up such hot cabin air has simply been recirculated until the air is cooled by mixing with cold air in the mixing box 43, to a desired cabin 44, 45 temperature. Thus the heat of the cabin air is lost from the system 10. A proportion of the air in the cabin 44, 45 may be ejected to ambient as indicated through the outlet 47, so that a proportion of the cabin air 44 is refreshed by the air from the air conditioning system 10.

The system 10 provides a means for recovery of heat energy from hot cabin air.

Cabin air is recirculated from the cabin 44, 45 with fan 60 assistance, and the hot cabin air first passes via the duct 62 to the load heat exchanger 38 through which the medium pressure air from the first expansion turbine 34 passes. Thus heat from recirculating the hot cabin air is used to warm the cooled medium pressure air prior to passing to the second expansion turbine 41.

After the load heat exchanger 38, the recirculating cabin air passes through the condenser heat exchanger 130 in which it cools the warm pressurised air delivered along the duct 29. After having passed through the load heat exchanger 38, the recirculating cabin air will be sufficiently cool to exchange heat effectively with the warm pressurised air from duct 29 and cause condensation and separation of the or a substantial proportion of the water content thereof (further water removal being provided by the water separator 31 if present).

Water separated from the warm pressurised air by the condenser heat exchanger 130 (and the separator 31 if present) is delivered by a line 131 to a spray 132 in the duct from the ram air inlet 11 upstream of the heat exchangers 16, 18. This has the effect of increasing the cooling effect of the heat exchangers 16, 18, by virtue of evaporation of the water at the surfaces thereof.

FIG. 2 illustrates a modification of the cooling section of the system 10, in which components corresponding to those above described are identified by the same references. Certain parts, namely the water separator 31 and by-passes 56, 57, 58 have been omitted from FIG. 2 in the interests of simplicity, but it will be appreciated that they may be present.

In FIG. 2, the ducts 62, 66 by which recirculating cabin air arrives back at the mixing box 43 have been rearranged so that the recirculating air firstly passes through the condenser heat exchanger 130 and then the load heat exchanger 38. Although the recirculating cabin air will be warm, it will be substantially cooler than the pressurised air reaching the cooling section of the system from duct 29, and thus reduces the temperature of the warm pressurised air to promote the separation of water therefrom. In doing this, the circulated cabin air will be raised in temperature, and its increased energy content can then be transferred in the load heat exchanger 38 to the air passing from the high pressure turbine 34 to the low pressure turbine 41, so that energy can be recovered in the latter.

The inset, FIG. 2a, to FIG. 2 shows a modification wherein valves 135, 136, 137 may be provided in the ducts 62, 66 together with by-pass ducts 138, 139, operable so that the recirculating cabin air may be supplied firstly to the condenser heat exchanger 130 (followed by the load heat exchanger 38) or to the load heat exchanger 38 (followed by the condenser heat exchanger 130) as desired. A controller for controlling operation of the valves 135–137 is indicated at 141.

What is claimed is:

1. An air conditioning system for an aircraft, in which cabin air is recirculated and mixed with cold air from an air conditioning machine which includes at least one expansion turbine over which warm pressurised air is expanded and cooled, and further includes a heat load exchanger in which a heat load from hot cabin air is exchanged with the warm pressurised air prior to the pressurised air being expanded by the expansion turbine; and wherein there is a condenser heat exchanger in which recirculating cabin air is brought into heat exchange relationship with the warm pressurised air to cool and promote water removal therefrom prior to its being expanded by the expansion turbine.

2. A system according to claim 1 wherein the recirculating cabin air is passed through the condenser heat exchanger after it has been passed through the load heat exchanger.

3. A system according to claim 1 wherein the recirculating cabin air is passed through the condenser heat exchanger before it passes through the load heat exchanger.

4. A system according to claim 1 which is selectively operable in a first mode in which the recirculating cabin air is passed through the condenser heat exchanger after it has been passed through the load heat exchanger and in a second mode in which the recirculating cabin air is passed through the condenser heat exchanger before it passes through the load heat exchanger.

5. A system according to claim 1 wherein water removed from the warm pressurised air in the condenser heat exchanger is used to assist in cooling of engine bleed air supplied to the system.

6. A method of operating an air conditioning system in an aircraft of the kind in which cabin air is recirculated and mixed with cold air from an air conditioning machine which includes at least one expansion turbine over which warm pressurised air is expanded and cooled, and wherein the system includes a load heat exchanger in which a heat load from hot cabin air is exchanged with the warm pressurised air prior to the pressurised air being expanded by the expansion turbine; the method including bringing recirculating cabin air into heat exchange relationship with the warm pressurised air prior to the pressurised air being expanded by the expansion turbine, to cool and assist in removing water from the warm pressurised air.

7. A method according to claim 6 wherein the recirculating cabin air is brought into heat exchange relationship with the warm pressurised air after the cabin air has passed through the load heat exchanger.

8. A method according to claim 6 wherein the recirculating cabin air is brought into heat exchange relationship with the warm pressurised air before the cabin air is passed through the load heat exchanger.

* * * * *